(12) United States Patent
Sanchez et al.

(10) Patent No.: US 6,797,342 B1
(45) Date of Patent: Sep. 28, 2004

(54) DEFLOCCULATION APPARATUS AND METHODS THEREOF

(75) Inventors: J Michael Sanchez, Fairport, NY (US); Paul C. Lincoln, Rochester, NY (US); John M. Hammond, Ontario, NY (US); Thomas A. Trabold, Pittsford, NY (US); Cindy C. Chen, Rochester, NY (US); Jian Cai, Penfield, NY (US)

(73) Assignee: Xerox Corporation, Stamford, CT (US)

(*) Notice: Subject to any disclaimer, the term of this patent is extended or adjusted under 35 U.S.C. 154(b) by 382 days.

(21) Appl. No.: 09/663,872

(22) Filed: Sep. 15, 2000

(51) Int. Cl.[7] .................................................. B06B 1/00
(52) U.S. Cl. ...................................... 427/600; 118/610
(58) Field of Search .......................... 427/600; 118/610; 210/748, 785, 767, 297

(56) References Cited

U.S. PATENT DOCUMENTS

| | | | |
|---|---|---|---|
| 3,890,240 A | * 6/1975 | Hochberg | 430/111.4 |
| 4,112,549 A | * 9/1978 | Min et al. | 19/304 |
| 4,337,158 A | * 6/1982 | Bodine | 210/785 |
| 4,692,188 A | 9/1987 | Ober et al. | 106/23 |
| 4,707,112 A | 11/1987 | Hartmann | 355/10 |
| 4,741,841 A | 5/1988 | Borre et al. | 210/785 |
| 5,576,075 A | * 11/1996 | Kawasaki et al. | 427/565 |

FOREIGN PATENT DOCUMENTS

EP 472 459 A1 * 2/1992

* cited by examiner

Primary Examiner—Katherine A. Bareford
(74) Attorney, Agent, or Firm—Fay, Sharpe, Fagan, Minnich & McKee, LLP

(57) ABSTRACT

A method including: sonicating a stream containing a dispersion comprised of agglomerated primary particles; and filtering the resulting sonicated stream containing a dispersion comprised of de-agglomerated primary particles. An apparatus including: an ultrasonic adapter to ultrasonicate a stream of a liquid dispersion of agglomerated primary particles; and a filter member adapted to filter the resulting ultrasonicated stream containing a dispersion of de-agglomerated primary particles; and optionally a coater adapted to coat the resulting filtered stream containing a dispersion of de-agglomerated primary particles onto a receiver.

19 Claims, 3 Drawing Sheets

DEFLOCCULATION APPARATUS AND METHODS THEREOF

CROSS REFERENCE TO COPENDING APPLICATIONS AND RELATED PATENTS

Attention is directed to commonly owned and assigned U.S. Pat. Nos. 4,707,112, and 4,692,188, which employ ultrasonic energy in imaging and materials processing applications. Attention is directed to commonly assigned copending application: U.S. Ser. No. 09/201,503 (D198513), filed Nov. 30, 1998, discloses an apparatus for filtering liquids.

The disclosures of the above mentioned patents and copending application are incorporated herein by reference in their entirety. The appropriate components and processes of the patents may be selected for the apparatus and processes of the present invention in embodiments thereof.

BACKGROUND OF THE INVENTION

The present invention is generally directed to a method and apparatus for processing a stream of suspended or dispersed particles. More specifically the present invention is directed to method and apparatus for fine particle filtration by way of deagglomeration of a liquid or gas stream of agglomerated particles and thereafter separating the deagglomerated particles from any residual agglomerated particles and other larger size particulate process stream contaminants. The present invention is also directed to method and apparatus for disrupting agglomerated primary particles with, for example, an ultrasonic agitator or disrupter system which enables efficient and controlled disruption of particulate agglomerates into primary particulates and permits efficient and controlled separation of the primary particles from the agglomerates. The present invention is also directed to method and apparatus with in-situ ultrasonic particulate cleaning capability and which capability permits convenient liberation of larger size particulate materials which particles may foul or interfere with the normal operating efficiency and efficacy of the particulate process stream, for example, blinding a filter member. The cleaning capability permits convenient cleaning of process stream componentry, for example, filter elements, plumbing conduits, valves, tanks, and the like components. The present invention provides a system, apparatus, and method for separating or removing larger size agglomerated particulates or contaminants from smaller primary particles, for example, agglomerated toner particles from primary toner particles, and for example, agglomerated photoreceptor charge generation pigments from the base or primary pigment particles. These and other embodiments of the present invention are disclosed herein.

In a typical electrostatographic printing system, a light image or digital image of an original to be reproduced is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or another support sheet such as plain paper. Other related marking technologies are known, for example, liquid immersion development, and solid or liquid ink jet imaging technologies wherein a liquid, solid, molten, sublimed, and the like marking formulations are deposited onto an imaging member, imaging intermediate member, or image receiver and wherein the marking or imaging material is typically conveniently packaged for end-user or operator installation. Thus it is readily apparent to one of ordinary skill in the art that embodiments of the present invention are readily adaptable to formulation and manufacture of marking formulations and other marking materials, for example, related consumable materials, such as, replenishers, photoreceptors, fuser rolls, backer rolls, fuser oils, cleaning formulations, photographic coupler dispersions, pigmented inks for photographic realistic printing, papers or transparency stock, specialty coatings for papers or transparency stock, such as high quality or specialty receivers, "T"-shirt transfers, and the like materials.

In embodiments, the system and methods of present invention provide unexpected benefits and superior performance levels to material analysts or operators, for example, in facilitating process efficiency with minimized down time or uninterrupted continuous performance, avoiding materials waste or downtime, and avoiding productivity losses associated therewith that results from filter clogging or fouling. These and other advantages of the present invention are illustrated herein.

PRIOR ART

In the aforementioned commonly owned and assigned U.S. Pat. No. 4,707,112, issued Nov. 17, 1987, to Hartmann, which discloses an electrophotographic printing machine in which an electrostatic latent image recorded on a photoconductive surface is developed with a liquid developer material comprising at least a liquid carrier having marking particles therein. The liquid developer material is furnished to the electrostatic latent image recorded on the photoconductive surface in a development zone to develop the latent image. Marking particles are substantially uniformly dispersed, for example, with mechanical or acoustical devices, in the liquid carrier of the liquid developer material at the entrance to the development zone so as deflocculate the marking particles.

In the aforementioned commonly owned and assigned U.S. Pat. No. 4,692,188, issued Sep. 8, 1987, to Ober, discloses a process for the preparation of ink compositions useful for jet printing processes which comprises (1) dissolving in water immiscible organic solvent a polymer composition and an organic oil soluble dye; (2) adding an aqueous phase water surfactant mixture thereto; (3) affecting emulsification thereof, for example, with ultrasound; and (4) subsequently evaporating from the aforementioned mixture the solvent thereby resulting, in an ink with the dye trapped in the polymer particles suspended in the aqueous phase.

In U.S. Pat. Nos. 4,741,841, issued, May 3, 1988, to Borre et al., there is disclosed a method and apparatus for particle separation where particulates which are less than and greater than a predetermined size and are entrained in a fluid are separated according to their respective sizes by passing the fluid and entrained particulates through a porous, cross-flow separator element while continuously vibrating the separator element to prevent buildup of particulates on the upstream side of the separator element.

Other references of interest include U.S. Pat. Nos. 5,209,822; 4,594,152; 5,338,451; 5,466,384; 3,750,889; and 5,628,909, which patents generally relate to cross-flow filtration but without vibration. The aforementioned patent references are incorporated in their entirety by reference herein.

There remains a need for a system and method for deagglomerating agglomerated particles into primary particles and for accomplishing subsequent unit operations on the primary particles, such as, separation of the primary particles from any agglomerated particles or contaminant particles, or coating of the primary particle dispersions or suspensions.

The system and method of the present invention is useful, for example, in the preparation of materials for electrophotographic imaging and printing systems and especially color and digital applications, particle size analysis and diagnostics, particle size development and management, and the like applications. As a specific example, the present invention can be used in the design and manufacture of superior flow and charge performing particulate materials, such as toner materials, and including toner surface additive materials, such as silicas, surface treated silicas, polymeric surface additive particles, and the like additives. Another area of application of the system, apparatus, and method of the present invention, includes for example, as a useful tool in the design, manufacture, diagnosis, or trouble shooting performance, of particle materials or particulate containing formulations, such as found in the imaging materials technology area, for xerography, ionography, silver halide photography, and the like technology areas. Other areas of application of the system, apparatus, and method of the present invention, include for example, pharmaceutical dosage form preparation and processing, including for example, timed release, delayed release, or controlled release formulations of primary particle or agglomerated particle formulations. Still other areas of application of the system, apparatus, and method of the present invention, include for example, particulate emission analysis, that is measurement of aggregated or agglomerated materials comprised of aggregates or combinations of primary particles. Representative technology areas include for example: environmental testing and analysis; pesticide and crop chemical formulation development and analysis; foodstuff formulation development and analysis; biotechnology formulation development and assays, for example, bacterial and viral agglomerate particle analysis; wear analysis of moving parts, for example, fragmented or wear particulates and the analysis of the aggregates thereof, such as the extent of agglomeration and the strength of the agglomerates.

SUMMARY OF THE INVENTION

Embodiments of the present invention, include:

A method comprising:

sonicating a stream containing a dispersion comprised of agglomerated primary particles; and filtering the resulting sonicated stream containing a dispersion comprised of deagglomerated primary particles;

An apparatus comprising:

an sonicator, such as an ultrasonicator, adapted to sonicate a stream of a liquid dispersion of agglomerated primary particles; and a filter member adapted to filter the resulting sonicated stream containing a dispersion of de-agglomerated primary particles; and An apparatus comprising:

a coater adapted to coat the above mentioned resulting filtered stream containing a dispersion of de-agglomerated primary particles onto a receiver.

These and other embodiments of the present invention are illustrated herein.

DETAILED DESCRIPTION OF THE INVENTION

Figure 1:
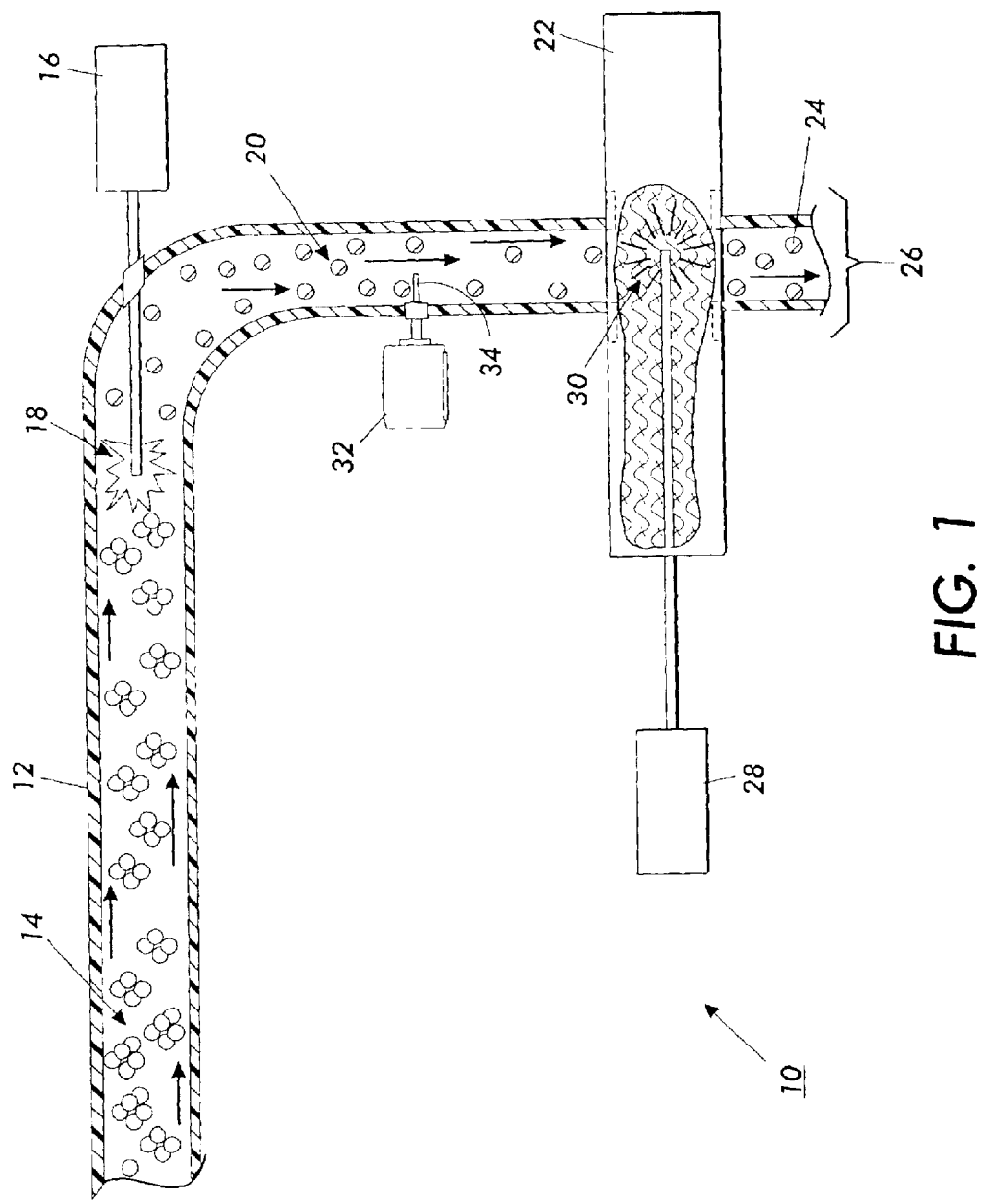
FIG. 1 illustrates a portion of an exemplary filtration apparatus and method of the present invention.

In embodiments the present invention provides a method comprising:

sonicating, for example ultrasonicating, a stream containing a dispersion comprised of agglomerated primary particles; and filtering the resulting sonicated stream containing a dispersion comprised of deagglomerated primary particles.

The method of the present invention, in embodiments, can further include coating the resulting sonicated stream containing the dispersion of primary particles onto a receiver surface. The receiver surface can be any suitable receiver. A preferred receiver is, for example, a photoreceptor substrate, and a more preferred receiver is a photoreceptor substrate previously coated with a known charge blocking layer, charge generating layer, or charge transport layer compositions, including but not limited to, for example, known drums, belts, and roller photoreceptor type substrates.

In embodiments of the present invention the primary particles can be, for example, toner particles comprised of, for example, a mixture of at least one colorant and a resin. In embodiments of the present invention the primary particles can be, for example, colorant particles comprised of, for example, one or more known pigment or dye particulate materials. The agglomerated primary particles can be present in the stream, for example, in an amount of 0 to about 60 weight percent based on the total weight of the stream. Subsequent to sonication the particle stream preferably contains weight percent of the agglomerated primary particles, whereas prior to sonication the particle stream can contain, for example, from about 0.001 to about 60 weight percent of agglomerated primary particles, and preferably from about 0.01 to about 40 weight percent of agglomerated primary particles.

The resulting de-agglomerated primary particles, in embodiments, can have a volume average diameter of, for example, from about 0.005 to about 20 micrometers. The primary particles can alternatively be, for example, a developer composition comprised of toner composition particles and carrier particles. In embodiments, the primary particles can also be obtained, for example, from a liquid immersion developer composition. In other embodiments, the primary particles can be, for example, a constituent or main component of a pharmaceutical dosage form. In still other embodiments the primary particle can be at least one colorant or a mixture of colorants, for example from 1 to about 10 colorants. The at least one colorant can be, for example, a pigment, a dye, combinations or mixtures thereof, hybrid colorants, and the like colorants, for example, filtering of nanoparticle pigmented ink jet inks.

The filtering of the deagglomerated dispersion or suspension of primary particles preferably removes at least one objectionable contaminant contained in the stream of de-agglomerated primary particles, for example, larger sized particles, such as, dust, dirt, non-dissociable or fused agglomerates, and the like particulate and non-particulate materials which particles may be related to, or unrelated to, the primary particles in the stream, that is, for example, by-products or contaminants of the primary particle dispersion stream. The contaminant material removed by filtration preferably has an average diameter particle size which is greater than the average diameter particle size of the de-agglomerated primary particles. In embodiments the stream can include a continuous liquid phase carrier vehicle, for example, a continuous liquid phase carrier vehicle can be, for example, an aqueous liquid, a non-aqueous liquid, or miscible and immiscible mixtures thereof. In embodiments the stream can include a continuous gas phase carrier vehicle. In other embodiments the stream can include a continuous phase comprised of a mixture of a liquid phase and a gas phase carrier vehicle, for example where the gas phase is dissolved in the liquid phase, or where the gas phase is a distinct separate phase from the liquid phase.

In the present invention, agglomerated dispersion refers to a dispersion of in particles wherein, for example, the base or primary particle size is smaller than the agglomerated particle size. The "agglomerated particle size" refers to at least the sum of the diameters of at least two primary particles and which particles are in close physical contact, and are optionally held together by at least some force and which force can be weak forces, intermediate forces, strong forces, or combinations thereof. A "primary particle" refers to the smallest constituent particle size, that is a building block particle and which building block particle is the smallest constituent particle size that is common to all other particles or a constituent of a larger particle or particles, or it can be a combination of two or more primary particles which combination forms an aggregate or agglomerate of primary particles.

In embodiments of the present invention the sonication work and its accompanying transformation of particle forms can be accomplished with a sonicator, for example, at least one ultrasonic member, such as an ultrasonicator with from one to about 10 ultrasonic horn.

The method of the present invention can further include, if desired, separating the de-agglomerated primary particles from the stream in the resulting sonicated stream. The separation of the de-agglomerated primary particles from the stream in the resulting sonicated stream can be accomplished, for example, with known microfiltration or ultrafiltration devices or apparatus and which separation can be accomplished, for example, on-line or off-line, and continuously, semi-continuously, or in batch.

The method of the present invention can further include sonicating the filter media with a second sonicator during the filtration of the sonicated stream. The method of the present invention can further include measuring the upstream pressure just prior to filtering or just prior to the filter or filtration system. The method can also or alternatively include measuring the stream pressure just after to filter or filtration system. The method of the present invention can also include measuring primary particle size of the de-agglomerated primary particles in the stream just prior to filtering. The method of the present invention can also further include in embodiments, if desired, re-agglomerating the resulting de-agglomerated primary particles, for example, by the controlled addition of a known flocculating or agglomeration agent, by increasing the ionic strength by the addition of for example, salts or complexing agents, by concentrating the dispersion or suspension of the de-agglomerated primary particles or by flocculating the dispersion or suspension of the de-agglomerated primary particles, or by any other suitable method known to one of ordinary skill in the art for re-agglomerating the resulting de-agglomerated primary particles. The method of the present invention can further include, if desired, analyzing the sonicated stream for third particles arising from degradation of the primary particles during sonication. A third particle analysis can serve a useful quality control function or particle size control function in certain manufacturing processes where, for example, the particle size and particle size distribution properties of the particulate dispersion or the isolated particles are particularly critical to the quality or performance of a product.

In embodiments, the stream of agglomerated or de-agglomerated particles can further comprise at least one surfactant. A surfactant can be useful, for example, in obtaining or maintaining a stable suspension or dispersion of the primary particles, in either an agglomerated or de-agglomerated state. Alternatively or additionally, a surfactant can be used, for example, to destabilize a dispersion of agglomerated or deagglomerated particles for the purpose of purification, isolation, formulation, and the like purposes, and the surfactant may be included in the particle dispersion in satisfactory amounts to achieve various desired properties or performance characteristics. It is readily evident to one of ordinary skill in the art that the choice of a surfactant is typically quite system specific and can depend heavily, for example, on the nature and constitution of the continuous phase, for example, whether there is an aqueous liquid phase, or a miscible or immiscible liquid solvent phase.

In an embodiment of the present invention there is provided a method comprising:

ultrasonicating a stream of a dispersion of agglomerated photosensitive particles;

filtering the resulting ultrasonicated stream containing a dispersion of deagglomerated photosensitive particles; and coating the resulting ultrasonicated stream onto a receiver surface.

In embodiments of the present there is provided an apparatus comprising:

an ultrasonicator adapted to ultrasonicate a stream of a liquid dispersion of agglomerated primary particles;

a filter member adapted to filter the resulting ultrasonicated stream containing a dispersion of de-agglomerated primary particles; and a coater adapted to coat the resulting filtered stream containing a dispersion of de-agglomerated primary particles onto a receiver.

The coated receiver can be, for example, photoreceptor member or other light sensitive or reactive articles or devices. The coated receivers of the present invention are preferably substantially free of agglomerated primary particles. The deagglomerating and coating apparatus of the present invention can, optionally, further include, for example, the aforementioned second ultrasonicator adapted to ultrasonicate the filter member. The second ultrasonication of the filter member by the second ultrasonicator can be accomplished, for example, when the coater is inactive, that is, during for example, a backflush or regeneration operation. Alternatively, the second sonicator can be operated continuously to insure that the filter member, for example, a filter membrane does not become fouled, plugged, or "blinded" during the regular course of processing streams containing agglomerated particles or agglomerated particles which may have inadvertently avoided disruption or deagglomeration by the action of the first sonication member.

The location, diameter, and geometry of the ultrasonicator member, such as ultrasonic horn tips, are chosen to optimize dispersion energy, the ultrasonic separation process, and the apparatus cleaning and regeneration aspects of the present invention.

The solids content of the input particle agglomerate process stream, such as agglomerated toner particles, can be selected and balanced with other production factors and intrinsic limitations, such as the throughput capacity and efficiency of the process stream. The solids content can also be carefully chosen to optimize the deagglomeration of the particle agglomerates and the stability of the primary particle dispersion once the agglomerates are broken down to primary particles.

A particularly advantageous and useful feature of the present invention is the capability to filter a heavily flocculated pigment dispersion with one or more filter members having a mean pore diameter considerably smaller than normal filtration in the absence of ultrasonic de-flocculation/agglomeration as practiced in the present invention. In embodiments, for example, in the working examples, filtration capability is demonstrated that is well above what could normally be obtained or be expected without the ultrasonic deflocculation system in accordance with the present invention.

In embodiments, the sonication can be accomplished, for example, with at least one ultrasonic member. The at least one ultrasonic member can be, for example, in embodiments from one to about 10 ultrasonic horn, and preferably one immediately upstream of the filter cartridge or member, that is, where the first ultrasonic member is situated as close as possible to the filter member without making physical contact with the filter cartridge or member. In systems where multiple filter housings are selected one can provide if desired, for example, multiple ultrasonic horns feeding, that is proximately preceding, those individual filter housings. The at least one ultrasonic member or plurality of ultrasonic members can be controlled by any suitable ultrasonic power source, and preferably a high powered ultrasonic source, such as a high powered ultrasonic welding source. The sonicator can be, for example, at least one ultrasonic member and a high powered ultrasonic welding source controller, and the at least one ultrasonic member can be, for example, from 1 to about 10 ultrasonic horn. The use of a high powered welding source and controller enables the system to be a reliable and efficient production tool. The ultrasonic member or members function to firstly, separate the agglomerates from each other, and secondly to separate individual primary particle constituents of the agglomerates to produce a process stream comprised, substantially or exclusively, of a primary particle suspension or dispersion. The sonicated liquid phase containing the suspended primary particle suspension can be stable for time periods spanning at least the time it takes for the resulting sonicated primary particle dispersion to traverse the filter medium or members, for example for several tenths of a second to considerably longer periods of time, depending upon the constitution of the dispersion and conditions acting upon the dispersion, such as example, from about 0.2 sec to about 1 year, depending on colloidal stability. Hence, this permits convenient manipulation, separation, and coating of primary particle dispersions as exemplified and illustrated in embodiments of the present invention. Ultrasonic componentry is commercially available, for example, from Sonics & Materials, Inc., Newtown, CT.

The liquid phase selected can be any suitable liquid, including for example, an aqueous liquid, a non-aqueous liquid, a supercritical fluid, a miscible mixture, an immiscible mixture, a slurry, and mixtures thereof, and the like combinations.

In embodiments of the process of the present invention, the suspension or dispersion of primary particle agglomerates or dispersion of the primary particles can further comprise the inclusion of at least one surfactant in the suspension prior to, or after the sonication of the mixture. The agglomerate particles can be present in the process stream, for example, in an amount of from about 0 to about 60 weight percent based on the total weight of the suspension. In embodiments, the agglomerate particles can be comprised of a toner composition with or without one or more surface additives present. In embodiments, the agglomerate particles can be, for example, a developer composition comprised of toner composition and carrier particles. Alternatively, in an embodiment the agglomerate particles can be a liquid developer or a pigmented liquid ink formulation. In embodiments the agglomerate particles can be, for example, those contained or obtained from a liquid immersion developer composition, for example, either with or without the liquid carrier present. In embodiments the agglomerate particles can be a pharmaceutical dosage form, and intermediate ingredient in a pharmaceutical dosage form process stream, or a precursor to a dosage form. Examples of pharmaceutical dosage forms include but are not limited to known solids, liquids, gels, foams, emulsions, microemulsions, suspensions, such as tablets, crushed tablets, powders, capsules, and the like formulations which can be suspended in a liquid or a supercritical fluid.

In embodiments of the present invention the extent of ultrasonic agitation of the Fit agglomerated particles can be adjusted to either avoid disturbing surface treatment materials residing on the surface of the primary particles, or alternatively adjusted to strip off the surface treatment materials residing on the surface of the primary particles. Examples of surface treatment materials can include but are not limited to, for example, known fumed silica materials, with or without a surface treatment or additive on the surface of the fumed silica. A particularly preferred turned silica is one which has been hydrophobically surface treated and wherein the surface treatment is accomplished by physical methods, such as solution coating, or by chemical methods, such as vapor phase reaction with silicon halide compounds followed by hydrolysis.

Referring to the Figures, FIG. 1 illustrates a portion of an exemplary filtration system and apparatus (10) of the present invention including a feed conduit (12), an agglomerated dispersion particle stream (14), an ultrasonic source generator (16) which can be situated either internally or externally to the conduit, which source is connected to an ultrasonic energy discharge probe (18) and which probe preferably resides within the conduit (12) and is in direct contact with the dispersion (14) stream. In embodiments, the ultrasonic energy discharge probe is preferably secured within the conduit such that the probe is in contact with an elastomeric or otherwise flexible materials such as O-rings or seals of TEFLON®, VITON®, and the like adaptive materials which materials can minimize or eliminate potentially deleterious effects of the sonication on the surrounding mechanical componentry and its integrity. Subsequent to the region occupied by the discharge probe (18) there is found de-agglomerated dispersion (20) or primary particles(20) and little or no agglomerated dispersion particles (14). The primary particle stream can next optionally encounter a filter member (22) which acts upon the primary particle stream to remove any large particles, including agglomerates or contaminants to afford primary particle filtrate stream (24) free of large particle agglomerates or large particle contaminants after the filter element (22). The primary particle filtrate stream (24) can be directed to, for example, a coater die (26) (not shown) or other similar devices or apparatus to make use of the highly disperse primary particle stream (24). In embodiments, the system can include an optional ultrasonic source generator (28) situated near filter member (22) which acts to activate ultrasonic energy discharge probe (30) within filter member media (22) and which activation produces vibration or sufficient energy dissipation to liberate, for example, trapped primary particles or agglomerated particles, for example, during a cleaning or backflush operation, or alternatively or additionally, during regular and continuous operation to extend the filter life and prevent filter "blinding". In embodiments the system can include an optional, relative or absolute, high pressure sensor (32) and associated optional absolute high pressure sensor probe (34). One or more other sensors can optionally or additionally be mounted at other strategic locations with in the particle stream, to continuously monitor the primary particle stream pressure. Measurement of the stream pressure can be an excellent indicator of the flow properties of the particles within the stream and can be an excellent indicator of the flow properties through the filter member element (22), and can indicate that the filter is becoming fouled or "blinded" form large particle agglomerates or contaminants, and which is good indicator that the filter needs to be regenerated or alternatively, reconditioned or replaced, reference for example the stream pressure measurement data in FIG. 3. For highly flocculating dispersions, that is those dispersion which are highly prone to flocculation or agglomeration, even for example when the particles are at relatively high dilution or dispersion, a preferred location of the ultrasonic probe is immediately upstream of the filter element. The closely situated ultrasonic probe ensures that the stream will contain substantially or exclusively dispersion of primary particle and little or no agglomerated particles in the vicinity of the filter member. In embodiments, for example, where the particles are highly agglomeration or flocculating, a plurality of ultrasonic probes can be strategically deployed in the stream conduit to ensure a primary particle stream just prior to the filter member or members. Any suitable type of filter member or system can be selected for the downstream filtration of the de-agglomerated dispersion, for example, a cylindrical cartridge type, a metal fitted disk, and the like filter media and filter articles.

Figure 2:
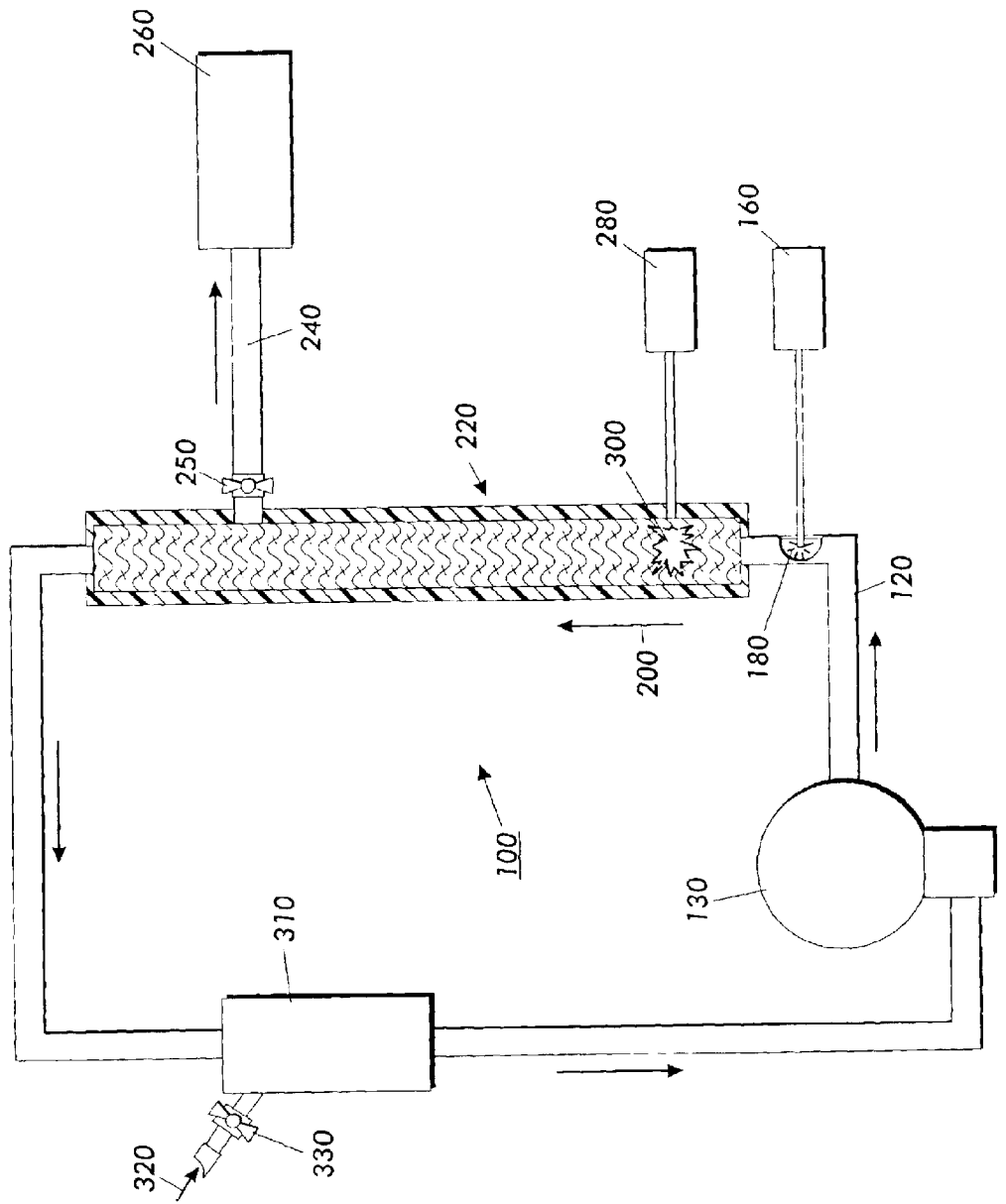
FIG. 2 illustrates a portion of an exemplary filtration system, apparatus, and method of the present invention.

FIG. 2 illustrates an exemplary filtration system, apparatus, and method of the present invention and which figure embodies many aspects of the foregoing FIG. 1. A filtration system (100) of the present invention in embodiments can include a feed conduit (120) which carriers an agglomerated dispersion, primary particle, or mixed particle stream by way of a motive force provided by, for example, a pump (130) or equivalent devices, to a downstream deagglomerating region in the vicinity of a filter member. An ultrasonic source generator (160) powers an ultrasonic energy discharge probe (180) producing an ultrasonic discharge into the particulate stream which produces a de-agglomerated dispersion (200), or alternatively, monodisperse particles or primary particle dispersion (200) which proceeds through a filter member (220). A filtrate stream (240) containing the primary particle dispersion can be directed through, for example, to an optional filtrate shut-off valve (250) to, for example, a coater die (260) (not shown in detail). In embodiments, the present invention can include an optional ultrasonic source generator (280) and connected to one or more optional ultrasonic energy discharge probe(s) (300) situated within filter member media (220). An optional recirculation control module (310) can include a slurry or aggregate input source (320) for adding fresh influent material or for removing backflush effluent or wash and control valve member (330).

Figure 3:
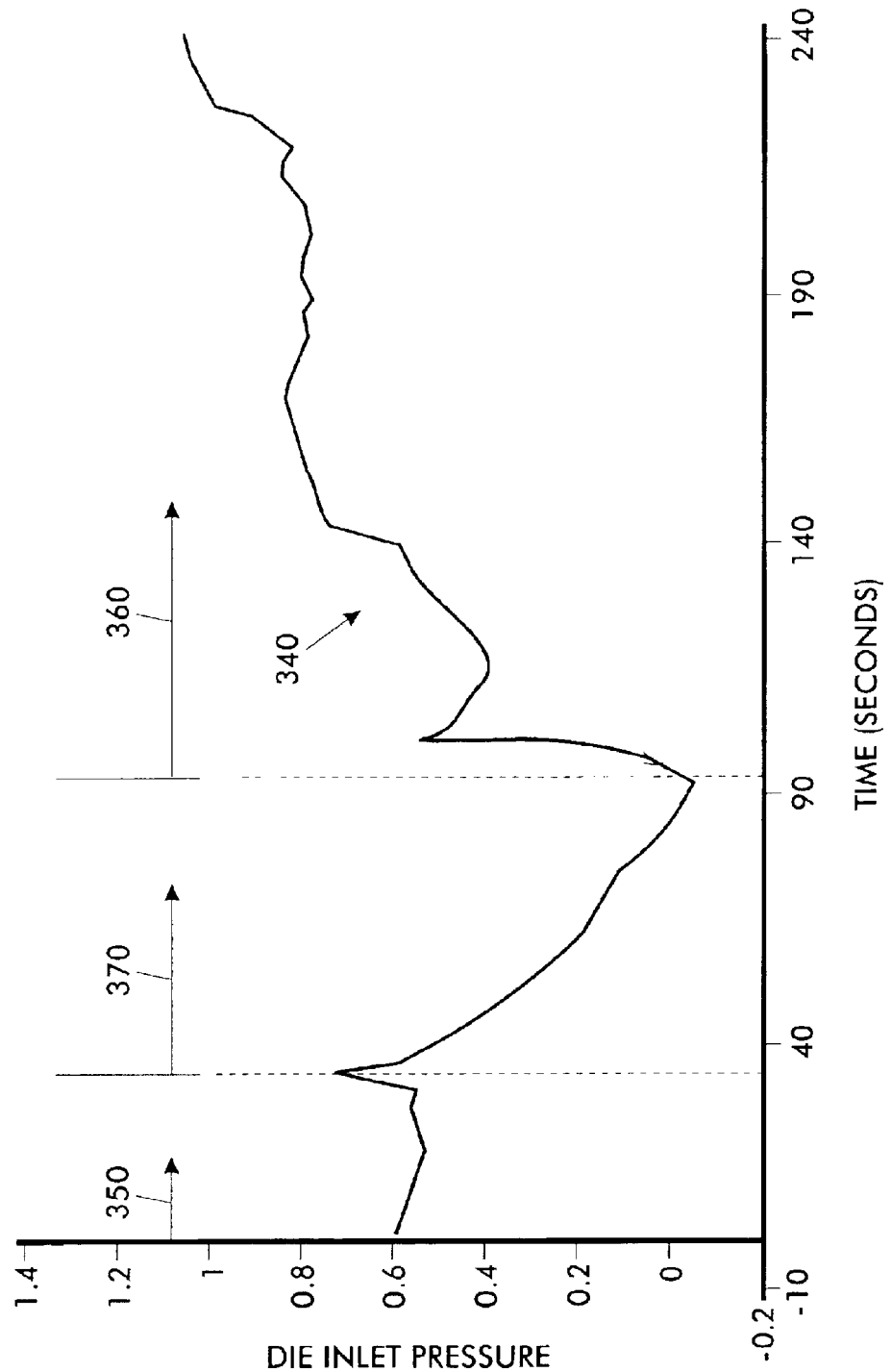
FIG. 3 is a graph which demonstrates a filtration flow relationship between time and inlet pressure and the influence of ultrasonication thereon in embodiments of the present invention.

FIG. 3 is a graph which demonstrates the effect of ultrasonic deagglomeration on the downstream flow-pressure leading to a coater die. The data were acquired from the filtration system via known and commercially available high speed data acquisition equipment. Line (340) shows averaged data that illustrates that increased coater die pressure follows from the application of ultrasonic energy upstream of the filtration system and indicates improved flow to the coater die. Thus during time intervals (350 and 360) where the ultrasonic probe is activated or energized there is provided increased stream flow through the apparatus, for example as shown in FIG. 2, and increased flow to the coater die. Conversely, during time interval (370) when the ultrasonic probe is inactive there is provided decreased flow to the coater die. When the ultrasonic probe remains activated for an extended period there is provided maximized coater die pressure(360) and flow, for example, in the range of from about 0.8 to about 1.2 pressure units, for example, as achieved using the filtration system configuration and apparatus as shown in FIG. 2. Examination of the filtration medium indicated complete clearing of agglomerated dispersion from the surface of the filtration medium. The pressure data was collected with a high speed Druck pressure sensor wired to a LabView data acquisition system. The system update or sample rate, for each data point, was 200 Hz.

Advantages of the present invention include but are not limited to, for example, reduced process time; improved filtration of agglomerated, pigmented liquid dispersions; improved cleaning of filter equipment or process equipment; and reduced downtime due to particle clogging and flocculating. An exemplary embodiment of the filtration and particle processing system of the present invention follows.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

EXAMPLE I

SONICATION A commercially available ultrasonic hom, with small diameter tip, was selected and coupled to power source and controller to obtain a system providing precise ultrasonic energy output from each ultrasonic horn for an unlimited number of ultrasonic events and volume of particulate containing stream. The power source delivers pulses to the ultrasonic hom(s) and enables a precise, repeatable, and measurable energy output from each horn to each specified and localized region of the apparatus. Thus electrical power was reproducibly converted to mechanical power in the vibrating ultrasonic hom. The time interval during which the ultrasonic horn is activated can be continuous or readily adjusted or varied, for example, to provide a pulsed or periodic ultrasonic irradiation.

Successful implementation of the system, apparatus and method of the present invention calls for pinpoint location of the ultrasonic energy source with respect to the agglomerated particle stream. For example, a very fine tipped probe was located within a small diameter tubing so that the bulk of the agglomerated dispersion flows within the energy field of the ultrasonically excited probe tip. In this manner all agglomerated dispersion is disrupted and flow enabled through fine filtration medium. Pigmented, highly flocculated charge generation pigment was passed by the energized ultrasonic probe and provided a substantially uniformly de-agglomerated dispersion and which dispersion was supplied to the coater die head to produce uniformly coated substrates.

EXAMPLE II

Nanoparticle dispersions can be readily produced where the separation of the milling medium, such as fine glass beads, metal balls, salts, and the like, from the nanoparticle product, such as pigmented inkjet ink formulations, is difficult in view of the close sizing of the milling medium beads and the desired resulting nanoparticles. Application of the deagglomeration system, apparatus, and method of the present invention to the crude product obtained from a nanoparticle or related grinding process can be deagglomerated and separated from the milling medium to efficiently provide high yield of the desired nanoparticulates thereby solving a longstanding separation problem.

EXAMPLE III

The deagglomeration system, apparatus, and method of the present invention can be applied to, for example, the filtration of color coupler dispersions containing a contaminant, for example, non-dispersed "oily globules". The globules can be of a size only slightly larger than the coupler particles themselves and, if the coupler is agglomerated, will often not filter out of the stream by conventional methods. The deagglomeration system, apparatus, and method of the present invention provides efficient and clean separation of the objectionable globules.

COMPARATIVE EXAMPLE I

A failure mode that can potentially defeat the present invention includes wide area dispersion of ultrasonic energy. Thus for superior results the ultrasonic energy discharge is preferably focused in an area just prior to the filter member medium, for example, for about 1 millimeter to about 20 millimeters from the filter member.

Other modifications of the present invention may occur to one of ordinary skill in the art based upon a review of the present application and these modifications, including equivalents thereof, are intended to be included within the scope of the present invention.

What is claimed is:

1. A method comprising:

sonicating a stream containing a dispersion comprised of agglomerated primary particles; filtering in the resulting sonicated stream containing a dispersion comprised of de-agglomerated primary particles and further comprising coating the resulting sonicated stream onto a receiver surface wherein the receiver surface is a coated photoreceptor substrate and wherein the de-agglomerated primary particles are separated in the resulting sonicated stream.

2. The method in accordance with claim 1, wherein the primary particles are toner particles comprised of a mixture of at least one colorant and a resin.

3. The method in accordance with claim 1, wherein the agglomerated primary particles are present in the stream in an amount of from about 0 to about 60 weight percent based on the total weight of the stream.

4. The method in accordance with claim 1, wherein the de-agglomerated primary particles have a volume average diameter of from about 0.005 to about 20 micrometers.

5. The method in accordance with claim 1, wherein the primary particle is at least one colorant.

6. The method in accordance with claim 1, wherein the filtering removes at least one objectionable contaminant contained in the stream of de-agglomerated primary particles.

7. The method in accordance with claim 6, wherein the contaminant has an average diameter particle size greater than the average diameter of ultrasonically de-agglomerated particles.

8. The method in accordance with claim 1, wherein the stream further comprises a continuous liquid phase carrier vehicle.

9. The method in accordance with claim 1, wherein the stream further comprises a continuous gas phase carrier vehicle.

10. The method in accordance with claim 1, wherein the sonication is accomplished with at least one ultrasonic member.

11. The method in accordance with claim 1, further comprising sonicating the filter media with a second sonicator during the filtering of the sonicated stream.

12. The method in accordance with claim 1, further comprising measuring the stream pressure just prior to filtering.

13. The method in accordance with claim 1, further comprising re-agglomerated the resulting de-agglomerated primary particles.

14. The method in accordance with claim 1, further comprising analyzing the sonicated stream for third particles arising from degradation of the primary particles during sonication.

15. The method in accordance with claim 1, the stream of agglomerated or de-agglomerated particles further comprises at least one surfactant.

16. A method comprising:

sonicating a stream containing a dispersion comprised of agglomerated primary particles; filtering the resulting sonicated stream containing a dispersion comprised of de-agglomerated primary particles, further comprising sonicating the filter media with a second sonicator during the filtering of the sonicated stream; and coating the resulting filtered stream containing a dispersion of de-agglomerated primary particles onto a receiver.

17. An apparatus comprising:

an ultrasonicator adapted to ultrasonicate a stream of a liquid dispersion of agglomerated primary particles; a filter member adapted to filter the resulting ultrasonicated stream containing a dispersion of de-agglomerated primary particles; and further comprising a second ultrasonicator adapted to ultrasonicate the filter member and a coater adapted to coat the resulting filtered stream containing a dispersion of de-agglomerated primary particles onto a receiver.

18. The apparatus in accordance with claim 17, wherein the coated receiver is substantially free of agglomerated primary particles.

19. The apparatus in accordance with claim 17, wherein the second ultrasonicator ultrasonicates the filter member when the coater is inactive.

* * * * *